(12) United States Patent
Grond-Soons et al.

(10) Patent No.: US 12,214,648 B2
(45) Date of Patent: Feb. 4, 2025

(54) HYBRID COMPOSITE TAILGATE

(71) Applicant: SABIC Global Technologies B.V., Bergen op Zoom (NL)

(72) Inventors: Ilona Maria Francois Grond-Soons, Schimmert (NL); Davy Wilhelmus Anna Brands, Maastricht (NL); David Vincentius Wilhelmus Maria De Vries, Eindhoven (NL); Sandeep Chandrakant Kulkarni, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/234,711

(22) Filed: Aug. 16, 2023

(65) Prior Publication Data
US 2023/0391172 A1   Dec. 7, 2023

Related U.S. Application Data

(63) Continuation of application No. 16/462,716, filed as application No. PCT/EP2017/081169 on Dec. 1, 2017, now Pat. No. 11,787,272.

(30) Foreign Application Priority Data

Dec. 1, 2016 (EP) ..................................... 16201600

(51) Int. Cl.
| | | |
|---|---|---|
| *B60J 5/10* | (2006.01) | |
| *B29C 45/00* | (2006.01) | |
| *B29C 45/14* | (2006.01) | |
| *B29C 45/16* | (2006.01) | |
| *B62D 29/04* | (2006.01) | |
| *B29K 309/08* | (2006.01) | |
| *B29K 623/00* | (2006.01) | |
| *B29L 31/30* | (2006.01) | |

(52) U.S. Cl.
CPC .......... *B60J 5/107* (2013.01); *B29C 45/14631* (2013.01); *B29C 45/1671* (2013.01);
(Continued)

(58) Field of Classification Search
CPC .......... B60J 5/107; B60J 5/101; B60J 5/0481; B29C 45/1671
(Continued)

(56) References Cited

U.S. PATENT DOCUMENTS 7,070,226 B2 * 7/2006 Cleland ................. F16F 9/0245
                                                          49/339
8,550,536 B2   10/2013 Gächter et al.
(Continued)

FOREIGN PATENT DOCUMENTS

| FR | 2966089 A1 | 4/2012 |
|---|---|---|
| FR | 3009705 A1 | 2/2015 |

(Continued)

OTHER PUBLICATIONS

European Search Report for EP Application No. 16201600.0, Filing Date Dec. 1, 2016, 2 Pages.
(Continued)

*Primary Examiner* — Dennis H Pedder
(74) *Attorney, Agent, or Firm* — CANTOR COLBURN LLP (57) ABSTRACT

The invention relates to a hybrid tailgate for a vehicle, comprising a thermoplastic inner structure forming the carrier frame of the tailgate, and at least one composite reinforcement part to reinforce the carrier frame, wherein the composite reinforcement part is connected to the thermoplastic inner structure at a first surface, wherein the composite reinforcement part forms a continuous load path in the inner structure enclosing a tailgate window opening for a window glazing part of the tailgate. Furthermore, the invention relates to a vehicle comprising such a hybrid tailgate. Moreover, the invention relates to a method of manufacturing such a hybrid tailgate, the method comprising forming a composite laminate part into an insert; placing the insert in
(Continued)

an injection molding tool; and over-molding the insert with polymer resin.

19 Claims, 5 Drawing Sheets

(52) U.S. Cl.
CPC ........ *B62D 29/043* (2013.01); *B29K 2309/08* (2013.01); *B29K 2623/12* (2013.01); *B29L 2031/30* (2013.01)

(58) Field of Classification Search
USPC ...................................... 296/146.8, 56, 106
See application file for complete search history.

(56) References Cited

U.S. PATENT DOCUMENTS

| | | | |
|---|---|---|---|
| 2014/0210233 A1* | 7/2014 | Brymerski | B29C 44/08 |
| | | | 264/46.5 |
| 2016/0229271 A1 | 8/2016 | Dassen et al. | |
| 2019/0366813 A1 | 12/2019 | Grond-Soons et al. | |

FOREIGN PATENT DOCUMENTS

| | | |
|---|---|---|
| JP | 2012061869 A | 3/2012 |
| JP | 2013082361 A | 5/2013 |
| WO | 2010071214 A1 | 6/2010 |
| WO | 2015052655 A1 | 4/2015 |
| WO | 2015091448 A1 | 6/2015 |

OTHER PUBLICATIONS

International Search Report for International Application No. PCT/EP2017/081169, International Filing Date Dec. 1, 2017, Date of Mailing Mar. 21, 2018, 4 Pages.

Written Opinion for International Application No. PCT/EP2017/081169, International Filing Date Dec. 1, 2017, Date of Mailing Mar. 21, 2018, 6 Pages.

Korean Office Action of the S.Y. Cha Patent Office dated Dec. 14, 2023 for corresponding Korean Application No. 10-2019-7018371, English translation provided, 11 pages.

* cited by examiner

HYBRID COMPOSITE TAILGATE

CROSS REFERENCE TO RELATED APPLICATIONS

This application is a Continuation of U.S. patent application Ser. No. 16/462,716, filed May 21, 2019, which is a 371 of International Application No. PCT/EP2017/081169, filed Dec. 1, 2017, which claims priority to European Application Serial No. 16201600.0, filed Dec. 1, 2016, all of which are incorporated herein by reference in their entireties.

BACKGROUND OF THE INVENTION

Field of the Invention

The present invention relates to a hybrid tailgate or rear door for a vehicle, in particular a motorized vehicle such as a car, comprising a thermoplastic inner structure and composite reinforcements. The invention further relates to a vehicle comprising such a hybrid tailgate. Moreover, the invention relates to a method for manufacturing such a hybrid tailgate.

Description of the Related Art

Weight reduction is key to automotive due to stringent worldwide carbon dioxide emission regulations. As a result, most lightweight solutions today use optimized aluminum or high strength steel designs for tailgate applications. Weight reduction is sought by using aluminum to maintain the required mechanical properties. Using aluminum is costly, due to material costs and the need of parts that are individually clad (usually made of thermoplastic polyolefins (TPO)) to meet aesthetical interior requirements.

To further reduce the weight, and to additionally reduce costs, plastic tailgates were sought after. Initially, plastic tailgates were developed from thermoset SMC-like materials. Sheet molding composite (SMC) is a ready to mold glass-fiber reinforced, thermoset, polyester material. Later on, thermoplastic parts were made of Long fiber reinforced PP (PP-LGF) that partially integrate the aesthetical TPO panels. However, these parts mostly contain metal inserts that are either over-molded, bolted to or glued to the inner structure. The metal inserts are needed to meet mechanical and thermal expansion requirements.

Current ongoing investigations are directed to replacement of the metal inserts by continuous fiber reinforced (FR) inserts. These FR inserts can be of the woven (bended fibers) or the laminate type (straight fibers).

Recently, thermoplastic composites have been used as alternative materials for tailgate inner structures. American patent publication U.S. Pat. No. 8,550,536 describes such a tailgate using fiber-reinforced thermoplastic plastic material. Often, metal hybrid structures combining a metal insert with PP-LGF are used.

Full thermoplastic tailgate inner structures combining TPO with composite material offer potential for further decrease in weight (weight out), part integration and reduction in costs (cost out).

BRIEF SUMMARY OF THE INVENTION

According to the invention, there is provided a hybrid tailgate for a vehicle, comprising a thermoplastic inner structure forming the carrier frame of the tailgate, and at least one composite reinforcement part to reinforce the carrier frame, wherein the composite reinforcement part is connected to the thermoplastic inner structure at a first surface, wherein the composite reinforcement part forms a continuous load path in the inner structure enclosing a tailgate window opening for a window glazing part of the tailgate.

The inner structure comprises a tailgate window opening in which a window glazing part of the tailgate may be placed. The reinforcement part forms a continuous load path in the inner structure enclosing or surrounding the tailgate window opening.

The carrier frame may comprise a top beam, two D-pillars extending from each end of the top beam, and a lower portion extending between the two D-pillars at a distance different from zero from the top beam. The top beam, D-pillars and the lower portion enclose the tailgate window opening for a window glazing part of the tailgate.

The composite reinforcement part is connected to a first surface of the inner structure, either by injection molding, overmolding, or adhesion by welding or gluing.

Preferably, the composite reinforcement part is connected to and forms an integral unit with the thermoplastic inner structure at the first surface, wherein the composite reinforcement part comprises a ribbing structure extending from the first surface, which ribbing structure forms a continuous load path in the inner structure surrounding the tailgate window opening.

The ribbing structure is part of the inner structure to reinforce the carrier frame and extends from a first surface of the inner structure. The ribbing structure can comprise ribs directed parallel, perpendicular and/or diagonally with respect to the top beam of the carrier frame.

The inner structure can have a thickness ranging from 0.9 mm to 5.0 mm, preferably 1.0 to 4.0 mm, more preferably 1.5 to 4.0 mm. The thickness may vary over the area covered by the inner structure. The ribbing or ribbing structure may have a thickness ranging from 0.6 to 5.0 mm, preferably from 1.0 to 4.0 mm.

DETAILED DESCRIPTION

According to an embodiment, the reinforcement part comprises a base and at least one upstanding reinforcement wall extending from a second surface of the base of the reinforcement part, wherein the upstanding wall forms a ribbing along the base. The reinforcement part is thus connected to the inner structure at the first surface. The upstanding wall may be a wall extending along a first edge of the base and/or a second edge of the base. Further, the upstanding wall may extend between the first and second edges at an angle ranging from −90° to +90°, preferably −45° to +45°. Preferably, the upstanding walls along the base and/or extending between the first and second edges forms part of the ribbing structure.

According to another embodiment, wherein the reinforcement part further comprises a composite material laminate, comprising at least one layer of a composite tape having a thermoplastic matrix material with continuous reinforcing fibers embedded in the matrix material. In this embodiment, the at least one composite reinforcement part comprises a composite material tape made of comprising a layer of matrix material with continuous reinforcing fibers embedded in the matrix material. The matrix material is preferred to be a thermoplastic material, such as a polyolefin. The continuous reinforcing fibers may be directed in the longitudinal direction of the tape. The term 'continuous fiber' may refer to fibers having the same length as the tape, i.e. the fiber stretches the length of the tape.

Preferably, the laminate is made of two or more layers of the composite tape. The continuous fibers in each layer may be oriented in a different direction with respect to a longitudinal direction of the tape. The orientation of the fibers in one layer with respect to the fibers in another layer may range from −90° to +90°. A preferred angle between the longitudinal direction of the continuous fibers of a first layer and the longitudinal direction of the continuous fibers of a second layer ranges from −45° to +45°. The thickness of the laminate can range from 0.1 mm to 6.0 mm. The thickness of one layer may vary from 0.1 mm to 0.3 mm. Preferably, a multiple layer laminate is used, having a thickness between 1.5 and 4.5 mm, more preferably between 2.0 and 4.0 mm. The thickness of the laminate may vary over its width and/or longitudinal directions, to locally increase reinforcement. This may be advantageous to an improved stress distribution at for instance the hinge connection portion, the gas strut connection portion, and/or the lock receiving portion which are typically the high load areas of the tailgate.

The laminate may be further overmolded with thermoplastic material at least compatible with the thermoplastic material of the inner structure, preferably similar. The thickness of the overmolded layer may range from 1.0 to 2.0 mm, preferably 1.5 mm.

The composite material laminate may form at least a portion of the base of the reinforcement part. The upstanding wall forming the ribbing may extend from the base formed by the laminate. Preferably, the composite material laminate is provided at one or more of a D-pillar, a top beam and a lower portion, extending at least over the hinge connection portion, the gas strut connection portion, and/or the lock receiving portion. Where the composite material laminate is not applied or cannot be applied, the ribbing or ribbing structure is provided, wherein the ribbing or ribbing structure at least partly overlaps with the composite material laminate to form the continuous load path in the inner structure. The ribbing or ribbing structure may also be applied for ease of manufacturing, for instance at corner regions, e.g. at the transition from the top beam to the D-pillar.

Depending on the design of the inner structure, applying just the ribbing structure as the reinforcing part may not be sufficient for optimal reinforcement of the inner structure, especially at the D-pillars. To optimize the reinforcement of the inner structure, a first step could be to provide the composite material laminate at the D-pillars, in addition to the ribbing structure. Additionally, the composite material laminate can be provided at the top beam. When further reinforcement is needed, the composite material laminate may also be added to the lower section (below back lite), furthermore covering complete inner surface area. To close the continuous load path, the ribbing or ribbing structure at least partially overlaps with the composite material laminate. Preferably, ribbing is present in all embodiments, to form a closed loading path from top beam to lock area. It is observed that the more area of the inner structure is reinforced with the composite material laminate, the more weight reduction with respect to traditionally reinforced inner structures can be achieved.

The hybrid tailgate is preferred to be free of metal reinforcement parts, or any metal inserts, except the lock of the rear door, i.e. the lock of the rear door or tailgate may be a metal lock, and possibly the hinges that may comprise one or more metal parts.

The thermoplastic inner structure may comprise, or consist of, a combination of a polypropylene (PP) reinforced with long fibers, for instance 30 to 60 wt. %, preferably 40 wt. % long glass fibers (PP-LGF), e.g. STAMAX® manufactured by SABIC. Using PP-LGF in combination with composite laminate inserts, either a woven or a unidirectional laminate with a certain ply stacking comprising of a certain shape, and connecting the main loading areas (hinge, gas strut and lock), an equally (mechanically) performing tailgate can be achieved with significant weight savings compared to tailgates with a traditional steel or aluminum inner structure or carrier frame.

The composite tape may comprise a polypropylene reinforced with continuous fibers, e.g. continuous glass fibers. The composite laminate may comprise two or more unidirectional tapes, which are stacked on top of each other under certain stacking angles or ply angles. Furthermore, the reinforced tape can comprise 30 to 60 vol. %, preferably 45% vol. continuous glass fibers. The laminate can be pre-shaped as three-dimensional laminate inserts. These laminate inserts can be inserted in an injection molding cavity to be overmolded with a thermoplastic material, for example a polyolefin, preferably a similar thermoplastic material as the matrix material of the composite material to enhance bonding between the base and the overmolded material. Alternatively, the laminate inserts can be connected by other methods such as gluing, bolting, clipping, etc. but this will negatively affect the mechanical performance and total costs.

The laminate may comprise a tape of unidirectional continuous fibers in a matrix material. Woven fibers, e.g. a textile from reinforcing fibers, can be used as well. However, CF-composite laminates offer superior stiffness and strength versus woven fibers composites and long, non-continuous, fiber filled materials, due to the continuous length of the fibers, i.e. the length of the fibers coincides with the length of the tape layer.

The tailgate may further be provided with a hinge connection portion, a gas strut connection portion, and/or a lock receiving portion, wherein a lock can be received for connection with the tailgate. Further, the continuous load path, i.e. the reinforcement part, may extend from a first side of a lock receiving portion provided in the tailgate, to a second side of the lock receiving portion, where the lock receiving portion closes the loop or path. The hinge connection portion may be used to connect the tailgate via hinges to the vehicle and may be located at an upper side of the tailgate window opening, near an upper side of the inner structure. The gas strut connection portion may be used to connect the gas struts to the tailgate and may be located at either end sides of the tailgate window opening. The lock receiving portion may be located at a lower side of the tailgate window opening, opposite the hinge connection portion, preferably at a location between the lower side of the tailgate window opening and a lower side of the inner structure.

The reinforcement part forms a continuous load path in the inner structure, for example from the hinge connection portion via the gas strut connection portion to the lock receiving portion. Optimal use of the reinforcement parts, i.e. locating them at areas of high loading, may reduce weight significantly. To form the continuous load path, main areas of high loading need to be connected by means of the reinforcement part. Such areas of high loading are the area between the hinge connection portions, the area between the hinge connection portions and the gas strut connection portions, and the area extending between the gas strut connection portions and the lock receiving portion.

As such, the reinforcement part may comprise a top reinforcement part for strengthening a top part or top beam of the inner structure, a D-pillar reinforcement part for strengthening the D-pillars of the inner structure and/or a further reinforcement part extending between the D-pillar reinforcement part to the lock receiving portion. When forming a continuous load path, the reinforcement part may be a continuous reinforcement part where the top reinforcement part is connected to a D-pillar reinforcement part at both ends, and where each D-pillar reinforcement part is connected to the further reinforcement part that extends towards the lock receiving portion of the inner structure of the tailgate.

The tailgate and its inner structure may have different shapes. For instance, where an upper portion comprising the tailgate opening, and the lower portion are in the same plane, i.e. where the normal directions of these respective portions are parallel, or where the upper portion and the lower portion are at an angle different from 0 or 180 degrees, i.e. where the normal directions of these respective portions are at an angle different from 0 or 180 degrees, thus forming an angle in the inner structure.

Example 1

Figure 1:
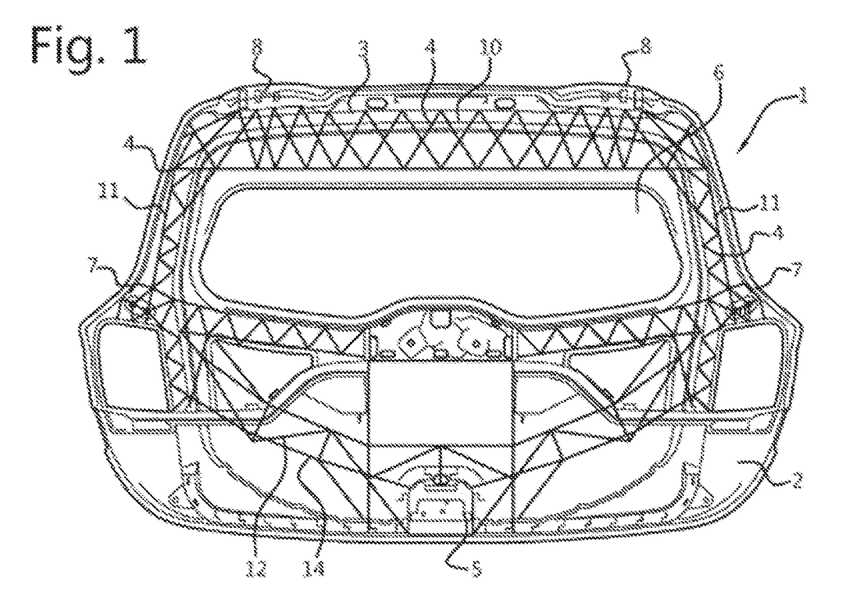
FIG. 1 shows an embodiment of a hybrid tailgate inner structure.

This first example, shown in FIG. 1, comprises a first tailgate 1 with an inner structure 2 fully made of PP-LGF, i.e. polypropylene matrix with long glass fibers reinforcement, with 40 weight. % of long glass fibers in the thermoplastic matrix. This first tailgate design is about 18% lighter compared to an aluminum design. Because of the relatively thick ribbing, this design is limited to the use for non-aesthetical parts. However, with increasing cross sectional area at the location of the D-pillar, thinner ribbing can be applied, making the design more suitable for aesthetic purposes.

The inner structure 2 is provided with a tailgate window opening 6 in which a window glazing part of the tailgate can be placed. This window glazing part may be an integral glazing part made of a transparent thermoplastic material, or a traditional glass window that is placed in the window opening at a later stage of the vehicle assembly. The reinforcement part 4 forms a continuous load path in the inner structure 2 enclosing the tailgate window opening 6.

The top reinforcement part 4 between the hinge connection portions 8 and the D-pillar reinforcement part 11 between the hinge connection portion 8 and the gas strut connection portion 7 comprises a ribbing structure 3 that may have a known ribbing pattern, i.e. a common reinforcement pattern. The further reinforcement part 12 between the gas strut connection portions 7 and the lock receiving portion 5 may be realized with a further ribbing structure 14 that may have a non-common ribbing pattern and possibly a partial aesthetical surface. The ribbing pattern may include parallel opposite ribs with ribbing extending between the parallel ribs, where the ribbing runs diagonally, i.e. at an angle different from 0 or 180 degrees, with respect to the parallel ribs. The ribbing structures 3, 14 are integrally injection molded with the inner structure.

When the further reinforcement part is provided with the partially aesthetical surface, it has the advantage that no extra cladding, i.e. covering, is needed for finishing the tailgate. However, such an aesthetical surface would imply that the ribs or upstanding walls will be limited in thickness to avoid sink marks in the surface, or that there would be no upstanding wall or ribbing present at the location of the aesthetical surface.

Example 2

Figure 2:
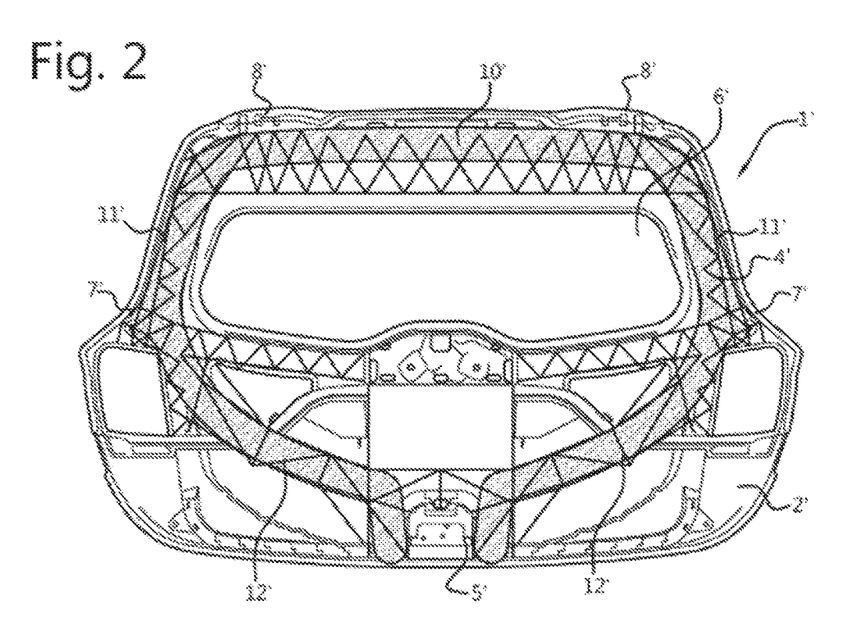
FIG. 2 shows an embodiment of a hybrid tailgate inner structure.

This second example, as shown in FIG. 2, comprises a second tailgate 1' with an inner structure 2' made of PP-LGF reinforced with CF-laminate reinforcements 10', 11', 12', i.e. an inner structure of PP-LGF with reinforcement parts comprising continuous fiber laminate material. The shape of the inserts is relatively flat to facilitate production and reduce costs, as no or at least only little preforming of the inserts is needed. The laminate parts used for the inserts may vary in thickness. For this second example, the optimal thickness are found to be layers for the top reinforcement part 10', located between the hinge connection portions 8' (area 1), for the D-pillar reinforcement part 11' between the hinge connection portions 8' and each of the gas strut connection portions 7', 8-18 layers (area 2), and for each of the further reinforcement parts 12' between the gas strut connection portions 7' and the lock receiving portion 5' (area 3) 6-8 layers, where all layers have ply angles of 0°, 45°, or −45°.

The top reinforcement part 10', the D-pillar reinforcements parts 11' and the further reinforcement parts 12' between the gas strut connection portions 7' and the lock receiving portion 5', forms a reinforcement part 4' constituting a continuous loading path. It is noted that in this example the CF-laminate forms the base of the reinforcement part, i.e. the ribbing is bonded to the base by overmolding the laminate with the PP-LGF material and forming a ribbing structure with upstanding walls, as described below.

This second example resulted in a weight reduction of about 35% compared to an aluminum tailgate design. Optimization of ply angles has shown that the optimal angles are close to the 0, 45, −45, 0° design. For example, the continuous fibers of a second tape layer may have an angle of 45° in a clockwise or counterclockwise direction with the continuous fibers of the first tape layer. This design has the advantage of improved long term loading or creep performance and a further weight reduction over the first design in Example 1.

Example 3

Figure 3:
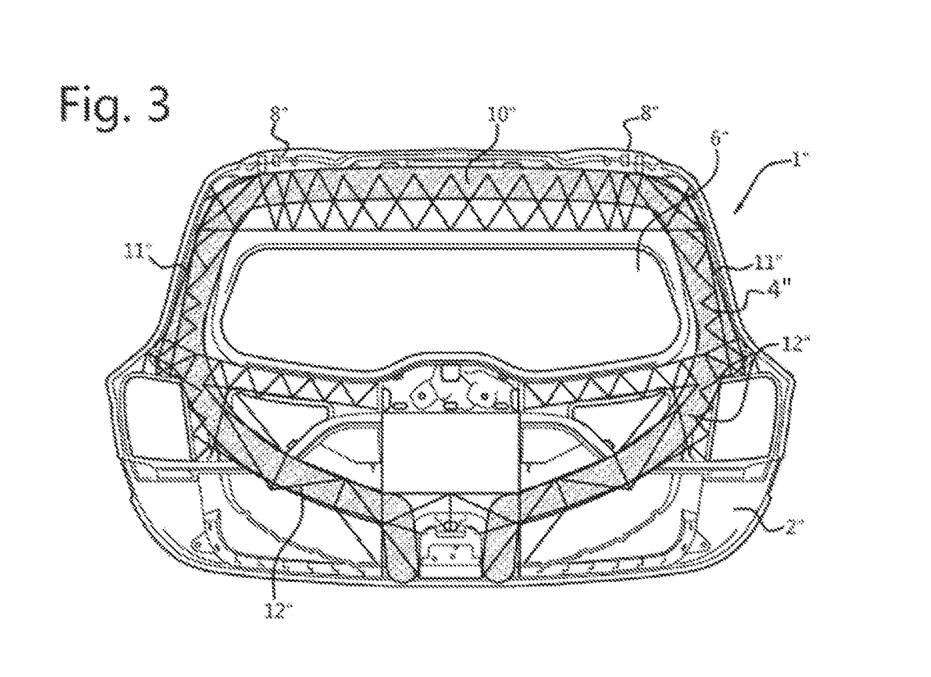
FIG. 3 shows an embodiment of a hybrid tailgate inner structure.

This third example, as shown in FIG. 3, comprises a third tailgate 1" with an inner structure 2" made of PP-LGF reinforce with pre-formed CF-laminate reinforcement parts 4", 10", 11", 12". The CF-laminate reinforcement parts have been pre-formed to a certain three-dimensional shape, see FIG. 5. This CF-laminate insert is a 3D shaped insert in an injection molding tool. The pre-formed CF-laminate part is part of the reinforcement part. The ribbing, is bonded to the base by over-molding the shaped laminate with the PP-LGF material, for instance by overmolding the ribbing structure into a channel shaped portion of the 3D insert.

The 3D laminate pre-form or insert provides additional weight reduction, but adds complexity to the manufacturing process and thereby adds costs. This third example is believed to achieve a weight reduction up to about 42% compared to a regular aluminum design of the tailgate.

Example 4

Figure 4:
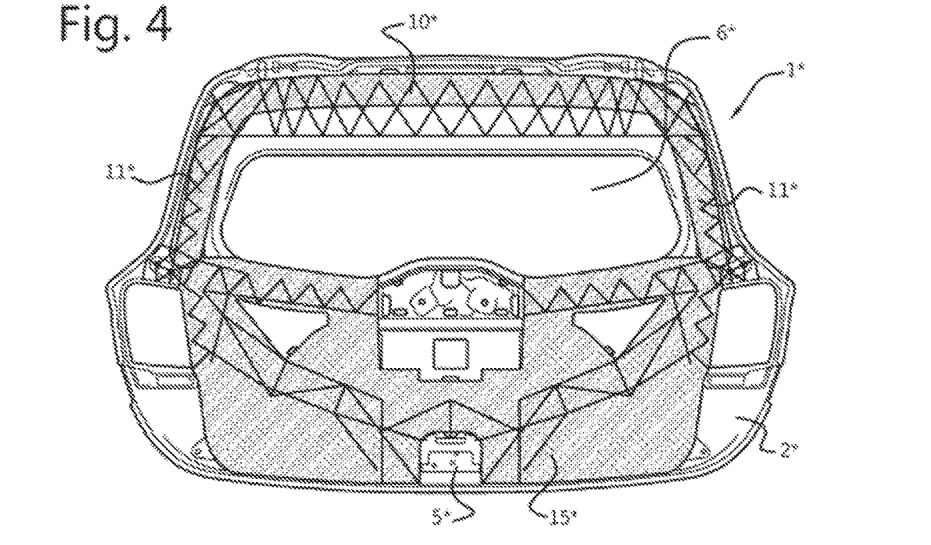
FIG. 4 shows an embodiment of a hybrid tailgate inner structure.

In FIGS. 2 and 3, the continuous fiber laminates are placed in critical load bearing locations. Alternatively, or additionally, the CF-laminate can cover a larger surface area 15\* in the lower portion of the inner structure, as shown in FIG. 4. The laminate is formed as relatively big sections of UD-tape-like plates. The laminate reinforcement area 15\* in FIG. 4 leaves space for the locking receiving portion 5\* and is connected with the D-pillar reinforcement parts 11\* to form a continuous load path with the top reinforcement part 10\*, enclosing the window receiving opening 6\* in the tailgate inner structure 2\*.

Figure 5:
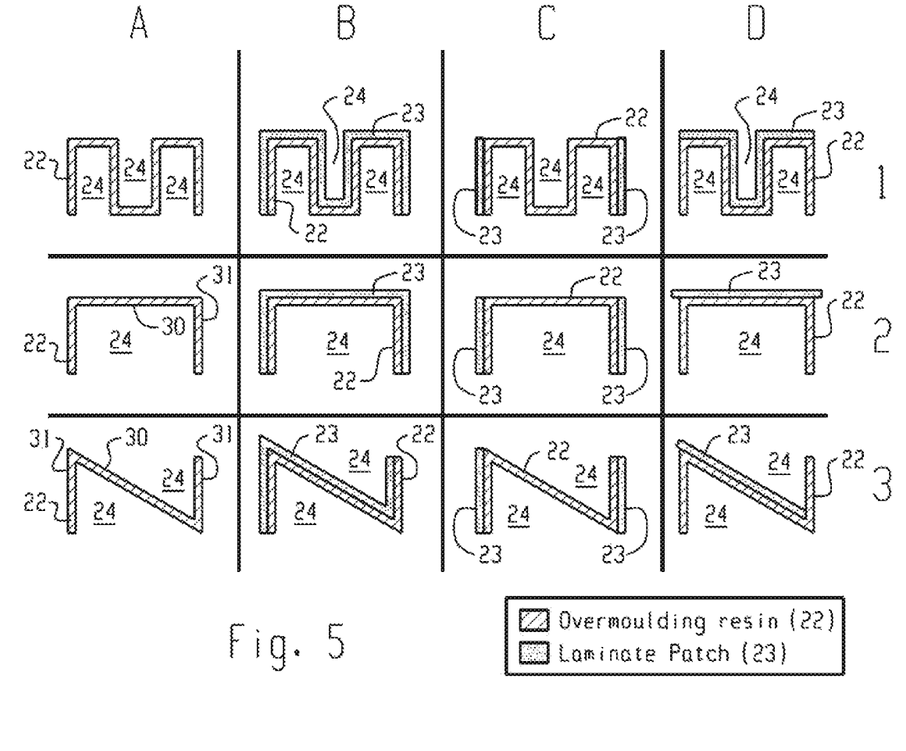
FIG. 5 shows several shapes of ribbing structure 22 and associated laminate insert 23.

FIG. 5 shows several shapes of the ribbing structure 22 and any associated laminate insert 23. The laminate insert 23 may be a three-dimensional shaped form having one or more channel shaped portions 24, that may be overmolded with thermoplastic resin, see column B and block D1 of FIG. 5. The laminate insert may alternatively be a flat insert that is located at one or more sides of the ribbing 22, see column C and blocks D2 and D3 of FIG. 5. Column A of FIG. 5 shows several forms of the ribbing structure 22 without a laminate insert.

Figure 6:
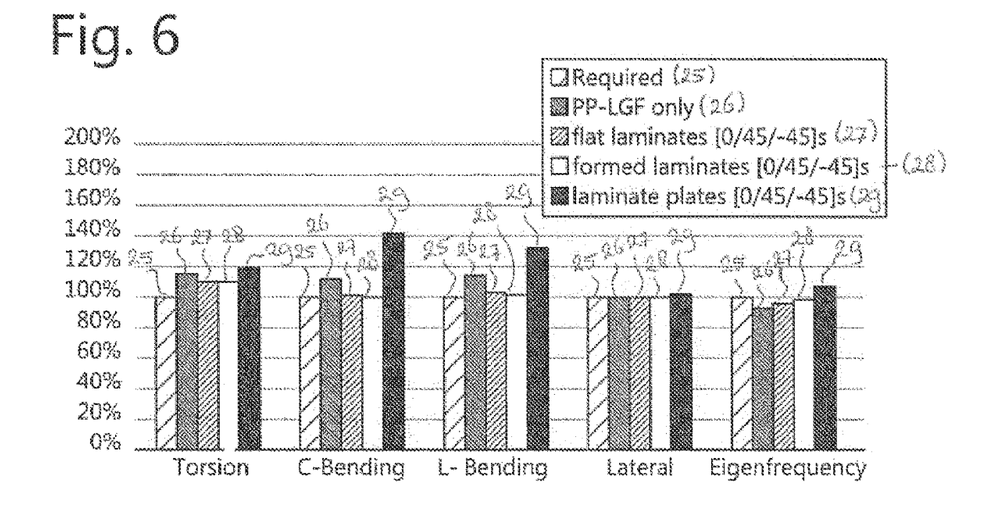
FIG. 6 is a graph of torsion strength, C-bending strength, L-bending strength, lateral bending, and Eigen frequency for Examples 1-4.

FIG. 6 shows that the tailgates according to Examples 1-4, as shown in FIGS. 1-4, meet the requirements concerning the torsion strength, C-bending strength, L-bending strength, lateral bending and the Eigen frequency. The present requirements (25) are set at 100%, and then the relative value of each property is given for the PP-LGF only inner structure (26), see example 1; the inner structure composed of PP-LGF with flat laminates (27), see example 2; the inner structure composed of PP-LGF with 3D pre-formed laminates (28), see example 3; and the inner structure composed of PP-LGF with laminate plates (29), see example 4.

Figure 7:
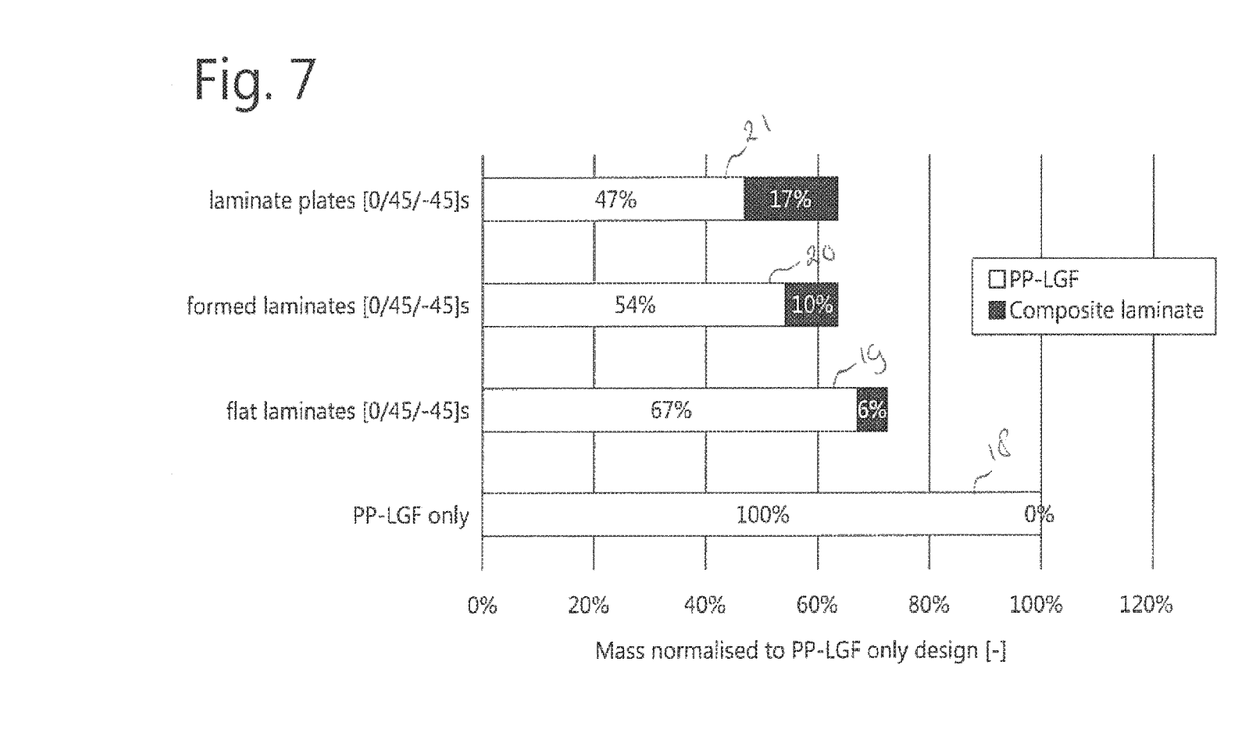
FIG. 7 shows the weight distribution between the PP-LGF and CF-laminate used in the different designs of the structural inner part.

The weight distribution between the PP-LGF and CF-laminate used in the different designs of the structural inner part is shown in FIG. 7. From this graph it can be observed that the higher the contribution of the CF-laminate, the more weight-reduction for the inner structure, and thereby the hybrid tailgate, is achieved. The inner structure composed of PP-LGF with flat laminates (bar 19, Example 2) is approximately 73% of the weight of the inner structure fully composed of PP-LGF with no laminate reinforcements (bar 18, Example 1). Using 3D pre-formed laminate inserts (bar 20, Example 3) compared to flat laminate inserts (bar 19) reduces the weight to about 64% of the weight of the inner structure fully composed of PP-LGF with no laminate reinforcements (bar 18, Example 1). However, this will increase the costs, as the amount of laminate material used has increased, and there is a need for more complex tooling, or an additional process step of preforming the insert into the desired shape. Similar reasoning can be applied to the laminate plate solution (bar 21, Example 4) that constitutes about 54% of the weight of the inner structure fully composed of PP-LGF with no laminate reinforcements (bar 18, Example 1).

Figure 8:
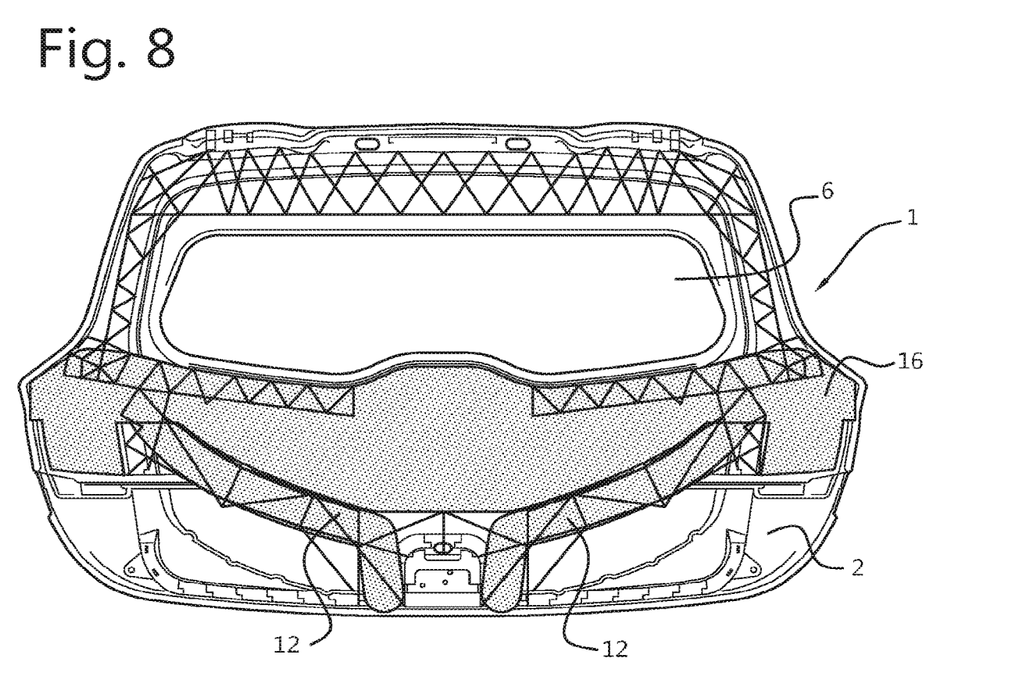
FIG. 8 shows an embodiment of a hybrid tailgate inner structure.
Figure 9:
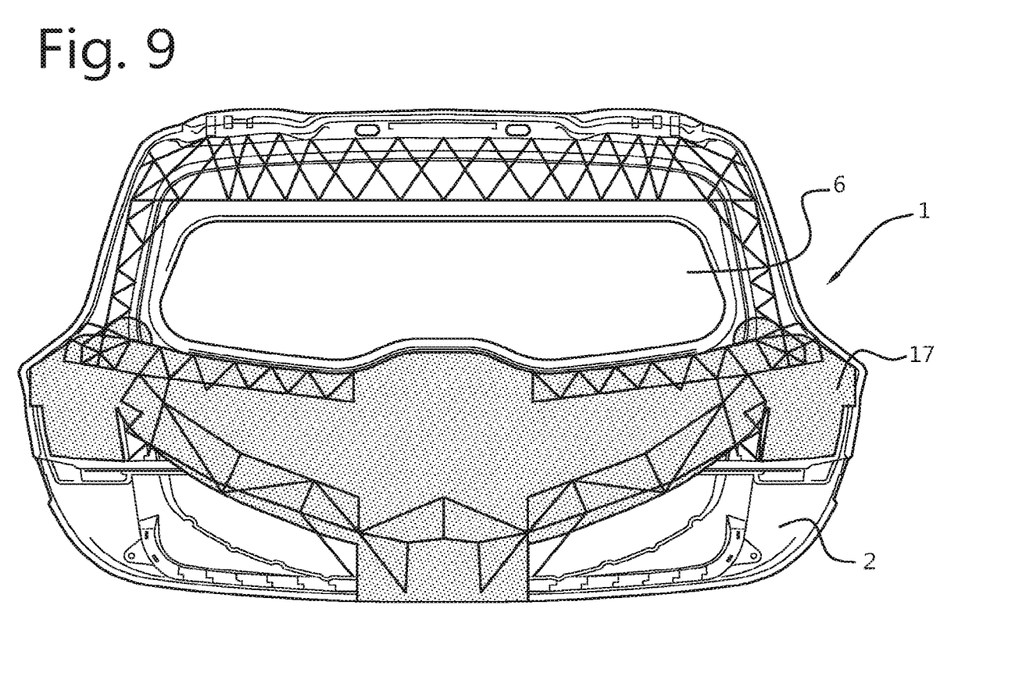
FIG. 9 shows an embodiment of a hybrid tailgate inner structure.

FIGS. 8 and 9 show embodiments of the hybrid tailgate inner structure comprising an inner cover 16, 17 to cover the inner structure. FIG. 8 shows a first embodiment of the inner cover 16, where the inner cover 16 covers the area enclosed by the further reinforcement parts 12, excluding these further reinforcement parts 12. Such a smaller inner cover 16 can be used when the aesthetic appearance of the further reinforcement parts is sufficient to act as the aesthetical surface in the non-covered areas.

FIG. 9 shows a second embodiment of the inner cover 17, where the inner cover 17 covers the area enclosed by the further reinforcement parts 12, including these further reinforcement parts 12. Such an extended inner cover 17 is then used as the aesthetical cover for the further reinforcement parts 12.

The present invention discloses a composite hybrid tailgate inner structure wherein continuous fiber composite and unfilled/filled thermoplastic composite are used in combination, to meet stringent mechanical requirement while providing weight reduction of the tailgate inner structure.

The continuous fibers in the composite can be glass, carbon, aramid or any other thermoplastic based fibers, or any combination thereof. The laminate used can be based on a unidirectional tape or on a fabric or a combination thereof. The fiber content in the laminate or tape can vary from 35% to 65% by volume.

The laminate used is obtained by stacking a number of plies (layers) one over the other, either in the same orientation to get directional properties, or in multiple orientation to get quasi-isotropic properties for the laminate. Laminates with different stacking sequences can be used in combination throughout the part to obtain the desired properties. The laminate can either be of constant thickness or have a variable thickness over its length.

The over-molding material is preferred to comprise short or long fiber filled material. The filling fiber can be glass, carbon, aramid or any other thermoplastic based fiber. The fiber filling content of the over-molding material and/or the PP-LGF material can vary from 10% to 50% by weight.

Preferably, the matrix material in the continuous fiber laminate and the over-molding resin are compatible, more preferred even similar, to achieve good bonding between the laminate and the over-molding material. Alternatively, the laminate may be joined to the resin material parts by means of gluing or mechanical fastening.

The invention further relates to a method of manufacturing a hybrid tailgate as described above. The current composite hybrid tailgate inner structure may be manufactured using a process comprising placing the composite material laminate in an injection molding machine; forming the composite material laminate in a desired insert shape while closing the injection molding tool; and over-molding the insert with polymer or thermoplastic resin.

Alternatively, or additionally, the method may comprise forming the laminate shape in a pressing tool, for example a vertical press, forming a shaped insert; and positioning the shaped insert inside the injection molding tool. The insert may then be over-molded to fill the remaining cavities in the injection mold tool. The upstanding wall or walls forming the ribbing may be manufactured during the over-molding step in the process.

The insert can either be a 2D, i.e. flat, shape, or a 3D shape. The insert may comprise an open channel 24 with a channel base 30 and channel upstanding walls 31. The ribbing structure or ribbing may be provided in the channel 24 and extending from the channel base and between the channel upstanding walls 31, on a similar side or on opposite sides of the base, see FIG. 5.

The invention also relates to a vehicle comprising such a hybrid tailgate comprising an inner structure as described above.

The invention claimed is:

1. A hybrid tailgate for a vehicle, comprising
a thermoplastic inner structure forming the carrier frame of the tailgate,
at least one composite reinforcement part to reinforce the carrier frame, and
an inner cover to cover the inner structure,
wherein the composite reinforcement part is connected to the thermoplastic inner structure at a first surface,
wherein the composite reinforcement part forms a substantially continuous load path in the inner structure enclosing a tailgate window opening for a window glazing part of the tailgate,
wherein the composite reinforcement part comprises
a pair of D-pillar reinforcement parts for strengthening the D-pillar of the inner structure; and
a pair of further reinforcement parts depending from the substantially continuous load path, each connected to and extending between each of the D-pillar reinforcement parts to a lock receiving portion of the inner structure, and
wherein the composite reinforcement part is connected to and forms an integral unit with the thermoplastic inner structure.

2. The hybrid tailgate of claim 1, wherein the reinforcement part comprises a composite material laminate.

3. The hybrid tailgate of claim 2, wherein a thickness of the laminate is from 0.1 mm to 6.0 mm.

4. The hybrid tailgate of claim 2, wherein the laminate is overmolded with thermoplastic material having a thickness of from 1.0 to 2.0 mm.

5. The hybrid tailgate of claim 1, wherein the reinforcement part comprises a multiple layer laminate and a thickness of one layer of the multiple layer laminate is from 0.1 mm to 0.3 mm.

6. The hybrid tailgate of claim 1, wherein the reinforcement part comprises a multiple layer laminate having a thickness between 1.5 and 4.5 mm.

7. The hybrid tailgate of claim 1, wherein the reinforcement part comprises a multiple layer laminate having a thickness between 2.0 and 4.0 mm.

8. The hybrid tailgate of claim 1, further comprising hinge connection portions and gas strut connection portions, wherein each of the D-pillar reinforcement parts between the hinge connection portions and each of the gas strut connection portions comprises a composite material laminate having 8-18 layers.

9. The hybrid tailgate of claim 1, further comprising hinge connection portions and gas strut connection portions, wherein each of the further reinforcement parts between the gas strut connection portions and the lock receiving portion comprises a composite material laminate having 6-8 layers.

10. The hybrid tailgate of claim 1, wherein the inner structure has a thickness of 0.9 mm to 5.0 mm.

11. The hybrid tailgate of claim 1, wherein the inner structure has a thickness of 1.0 to 4.0 mm.

12. The hybrid tailgate of claim 1, wherein the inner structure has a thickness of 1.5 to 4.0 mm.

13. The hybrid tailgate of claim 1, wherein:
the composite reinforcement part further comprises a top reinforcement part for strengthening a top part of the inner structure; and
the top reinforcement part is connected to each of the pair of D-pillar reinforcement parts at the ends of the top reinforcement part.

14. The hybrid tailgate of claim 13, further comprising hinge connection portions, wherein the top reinforcement part is located between the hinge connection portions and comprises a composite material laminate having 10-14 layers.

15. A hybrid tailgate for a vehicle, comprising
a thermoplastic inner structure forming the carrier frame of the tailgate,
at least one composite reinforcement part to reinforce the carrier frame, and
an inner cover to cover the inner structure,
wherein the composite reinforcement part is connected to the thermoplastic inner structure at a first surface,
wherein the composite reinforcement part forms a substantially continuous load path in the inner structure enclosing a tailgate window opening for a window glazing part of the tailgate,
wherein the composite reinforcement part comprises
a pair of D-pillar reinforcement parts for strengthening the D-pillar of the inner structure; and
a pair of further reinforcement parts, each connected to and extending between each of the D-pillar reinforcement parts to a lock receiving portion of the inner structure,
wherein the composite reinforcement part comprises a ribbing structure extending from the first surface, wherein the ribbing structure forms the substantially continuous load path,
wherein the composite reinforcement part further comprises a top reinforcement part for strengthening a top part of the inner structure, and
wherein the top reinforcement part is connected to each of the pair of D-pillar reinforcement parts at the ends of the top reinforcement part, and
wherein the composite reinforcement part is connected to and forms an integral unit with the thermoplastic inner structure.

16. The hybrid tailgate of claim 1, wherein the composite reinforcement part comprises a polypropylene reinforced with continuous glass fibers.

17. The hybrid tailgate of claim 16, wherein the composite reinforcement part comprises 30 to 60 vol. % continuous glass fibers, based on a total weight of the composite reinforcement part.

18. The hybrid tailgate of claim 1, wherein the composite reinforcement part comprises a ribbing structure extending from the first surface, wherein the ribbing structure forms the substantially continuous load path.

19. The hybrid tailgate of claim 18, wherein the ribbing structure has a thickness of 1.0 to 4.0 mm.

* * * * *